J. D. DE CELLE.
BEET HARVESTER.
APPLICATION FILED NOV. 30, 1909.
978,710.
Patented Dec. 13, 1910.
2 SHEETS—SHEET 1.
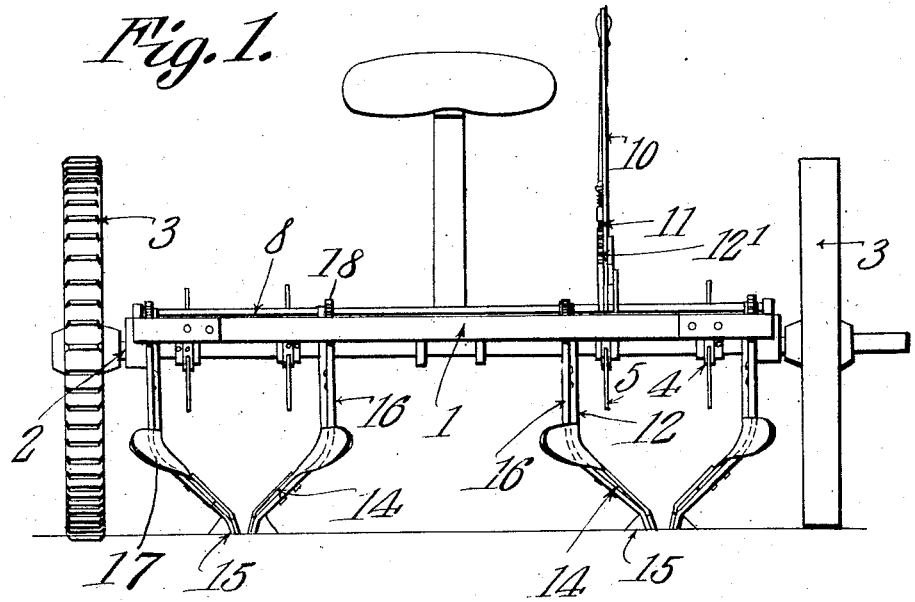
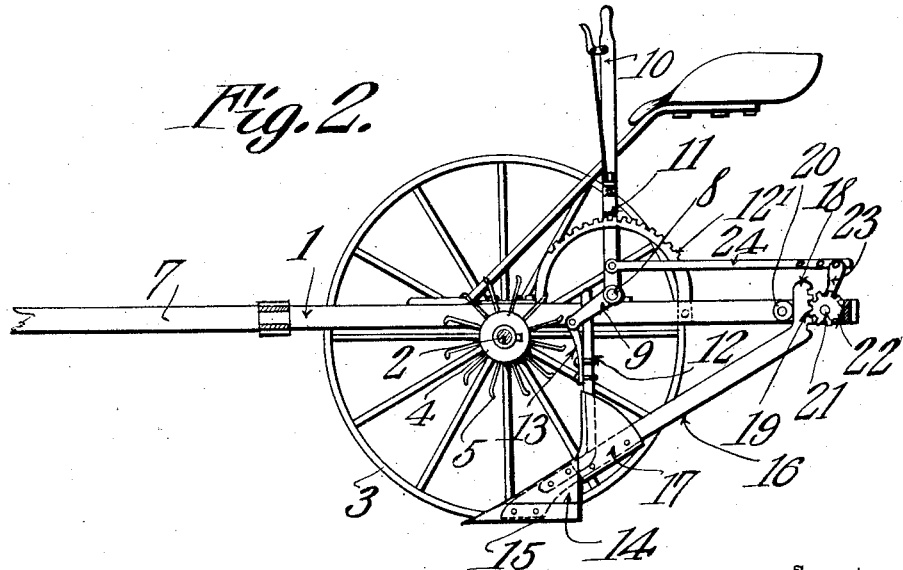
Inventor
Jerry D. DeCelle.
Witnesses

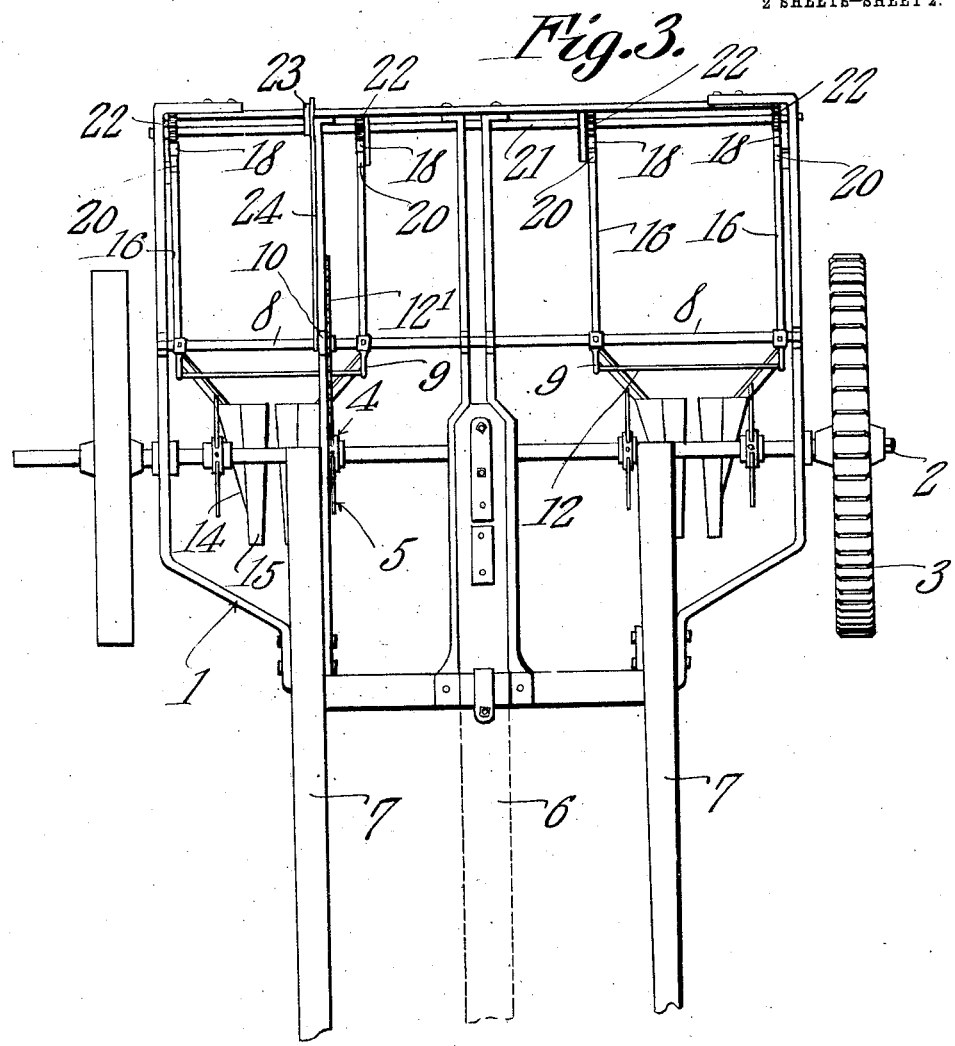
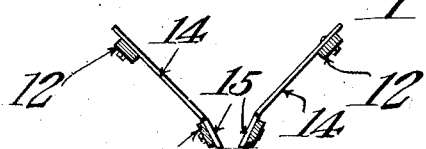

UNITED STATES PATENT OFFICE.

JERRY D. DE CELLE, OF FORT COLLINS, COLORADO.

BEET-HARVESTER.

978,710.   Specification of Letters Patent.   Patented Dec. 13, 1910.

Application filed November 30, 1909. Serial No. 530,608.

*To all whom it may concern:*

Be it known that I, JERRY D. DE CELLE, a citizen of the United States, residing at Fort Collins, in the county of Larimer and State of Colorado, have invented a new and useful Beet-Harvester, of which the following is a specification.

This invention has relation to beet harvesters and it consists in the novel construction and arrangement of its parts as hereinafter shown and described.

The object of the invention is to provide a simple and effective implement adapted to engage the beets in the ground and elevate the same in order that they may be readily removed therefrom, and with this object in view the structure of the implement includes a wheel mounted frame carrying one or more yokes with means for raising and lowering the same. Digging shares and mold boards are mounted at the ends of the yokes and standards are attached at their lower ends to the digging shares and are operatively connected with the means for raising and lowering the yokes whereby the said standards are simultaneously moved with the yokes. Shields are mounted upon the end portions of the yokes and standards where they approach each other and are adapted to serve as fenders to prevent the accumulation of trash.

In the accompanying drawings Figure 1 is a front elevation of the harvester. Fig. 2 is a longitudinal sectional view of the same. Fig. 3 is a top plan view of the same. Fig. 4 is a transverse sectional view through a set of shares and mold boards used upon the beet harvester.

The harvester consists of a frame 1 which is mounted upon an axle 2 which is supported by wheels 3. Disks 4 are mounted upon the axle 2 and carry fingers 5. The said disks 4 and fingers 5 are designed to prevent the foliage of the plants from wrapping about the axle 2 thus keeping the implement free of such material and they also serve as means for passing the foliage of the plants rearwardly.

The implement is designed to be operated by two or three draft animals as desired and when two animal are used a tongue (indicated at 6 in dotted lines in Fig. 3) is attached to the middle of the forward portion of the frame 1 and the draft animals are hitched one at each side of the said tongue. When it is desired that three draft animals be used the tongue at 6 in Fig. 3 is not employed, but shafts 7 are attached to the forward portion of the frame 1. One draft animal is hitched between the shafts and the other draft animals are hitched one at each side of the set of shafts.

A shaft 8 is journaled upon the frame 1 preferably at a point behind the axle 2 and is provided with laterally disposed arms 9. A handle lever 10 is fixed at its lower end to the shaft 8 and is provided with a spring actuated pawl 11. A gear segment 12' is mounted upon the frame 1 and is adapted to be engaged by the pawl 11. Yokes 12 are provided upon their sides with lugs or links 13 which are pivotally connected at their upper ends with the extremities of the laterally disposed arms 9 mounted upon the shaft 8. To the ends of the yokes 12 are attached mold boards 14. Digging shares 15 are located below the lower edges of the mold boards 14 and are also in inclined position approaching each other toward their lower edges. The said shares 15 are pointed at their forward ends as is usually the case. The lower ends of standards 16 are connected with the shares 15 and mold boards and at points where the said standards 16 approach the sides of the yokes 12, shields 17 are mounted which are designed to close the space between the approximate part of the standards 16 and yokes 12 and form fenders to prevent the accumulation of foliage or trash in the interval of space at the points indicated. The lower portions of the standards 16 are in inclined position while the upper portions are vertically disposed as at 18 and provided at their rear edges with gear teeth 19. Rollers 20 are journaled upon the frame 1 and the forward edges of the portions 18 of the standards 16 bear against the said rollers. A shaft 21 is journaled for rotation at the rear portion of the frame 1 and is provided at intervals with gear disks 22 which mesh with the teeth 19 of the upstanding portions 18 of the standards 16. An arm 23 is fixed to the shaft 21 and a rod 24 is adjustably and pivotally connected at its rear portion with the said arm 23 and is pivoted at its forward end to the lever 10 at a point above its fulcrum.

From the above description it is obvious that as the machine is drawn along the rows of plants and a row is permitted to pass between the members of each set of digging shares the shares will engage the beets at their lower portions and remove or cut the roots from the same and at the same time as the machine advances the beets are forced in an upward direction and pass along the mold boards 14 and are brought to the surface of the soil. When thus elevated the beets may be readily collected by any suitable means. It will be seen that by adjusting the positions of the yokes 12 and standards 16 vertically that the digging shares 15 may be caused to operate at any desired distance below the surface of the soil and by the assemblage of parts shown and described it will be observed that vertical adjustment of the yokes 12 is accompanied by similar adjustment on the part of the standards 16. Thus the said standards are always in proper relation to the yokes and are pitched at proper angles to the surface of the soil irrespective of vertical adjustment.

Having thus described my invention what I claim as new and desire to secure by Letters-Patent is:

1. A beet harvester comprising a frame, a yoke carried thereby, digging shares located at the ends of the yoke, standards connected at their lower ends with the shares and having at their upper rear ends gear teeth, means for raising and lowering the yoke and standards while the angle of pitch of the shares remains constant consisting of gear disks journaled upon the frame and meshing with the gear teeth of the standards, a lever mechanism mounted upon the frame, and means for operatively connecting said lever mechanism with said gear disks.

2. A beet harvester comprising a frame, a yoke carried thereby, digging shares located at the ends of the yoke, standards connected at their lower ends with the shares and having at their upper rear ends gear teeth, means for raising and lowering the yoke and standards while the angle of pitch of the shares remains constant consisting of gear disks journaled upon the frame and meshing with the teeth of the standards, a lever mechanism mounted upon the frame, means for operatively connecting said lever mechanism with the yokes, means operatively connecting the said lever mechanism with the gear disks, and rollers journaled upon the frame and bearing against the forward edges of the standards.

In testimony that I claim the foregoing as my own, I have hereto affixed my signature in the presence of two witnesses.

JERRY D. DE CELLE.

Witnesses:
FRANK EMIGH,
HARRY KIRBY.